United States Patent [19]

Niwa

[11] Patent Number: 4,481,666
[45] Date of Patent: Nov. 6, 1984

[54] READING-OUT APPARATUS

[75] Inventor: Hideaki Niwa, Hino, Japan

[73] Assignee: Kowa Company, Ltd., Nagoya, Japan

[21] Appl. No.: 332,213

[22] Filed: Dec. 18, 1981

[51] Int. Cl.³ .......................... G06K 9/38; H04N 1/40
[52] U.S. Cl. ...................................... 382/53; 358/282
[58] Field of Search ....................... 382/50, 51, 52, 53; 358/282, 280

[56] References Cited

U.S. PATENT DOCUMENTS

| | | | |
|---|---|---|---|
| 4,234,867 | 11/1980 | Butin | 382/53 |
| 4,329,717 | 5/1982 | Logie | 358/282 |
| 4,337,455 | 6/1982 | Smith | 382/53 |
| 4,351,004 | 9/1982 | Choate | 358/282 |
| 4,385,318 | 5/1983 | Miller | 358/282 |

Primary Examiner—Howard W. Britton
Attorney, Agent, or Firm—Burns, Doane, Swecker & Mathis

[57] ABSTRACT

In an apparatus for reading-out features such as characters and marks recorded on an object such as labels, boxes and cards, the object is scanned by a linear CCD array to produce a video signal and a background level is detected from the video signal on the basis of an edge signal derived from the video signal. A plurality of slice levels having span and pitch adjusted according to said background level are generated and the video signal is compared with the slice levels to produce an output video signal. Even if the level of the video signal changes abruptly, it is possible to obtain more accurate output video signal and to remove error in pattern recognition. In another preferred embodiment, an amplitude of the video signal is adjusted by a variable attenuator in accordance with the detected background level.

17 Claims, 33 Drawing Figures

FIG. 7A  Scanning Signal

FIG. 7B  {Video 1, Video 2}

FIG. 7C  Output from Comp. 14C

FIG. 7D  Output Edge Signal

FIG. 7E  {Video 1, Video 2}

FIG. 7F  Output from Comp. 14D

FIG. 7G  Output Edge Signal

FIG. 8

FIG. 9A Video Signal

FIG. 9B Edge Signal

FIG. 9C Gate Signal

FIG. 9D Gated Video Signal

READING-OUT APPARATUS

BACKGROUND OF THE INVENTION

The present invention relates to a reading-out apparatus for reading out features such as characters, marks, etc. recorded or labeled on box, card, etc. by processing a video signal obtained by scanning the features.

Such reading-out apparatus is generally used for a pattern recognition. As for a picking-up apparatus which generates video signal by scanning an object, two dimensional picking-up apparatus such as raster scanning type flying spot scanner, television camera, image detector, etc., and one dimensional picking-up apparatus such as solid image sensor, line scanning type flying spot scanner, etc. are widely used. In case of using two dimensional picking-up apparatus, it is not necessary to move the object and the picking-up apparatus relatively. But in case of using one dimensional picking-up apparatus, it is necessary to move the object, for example, in a direction perpendicular to a scanning one. In order to decrease errors in pattern recognition by performing precise reading-out procedure by means of either one or two dimensional picking-up apparatus, the video signal thus obtained must be processed adequately. For instance, it is generally carried out to convert the video signal thus obtained into black and white binary signal so as to compare this signal with a given threshold value. In one case, the threshold level is fixed, but in another case the threshold level is variable corresponding to the video signal level. In case of using variable threshold method it is possible to carry out more precise reading-out procedure than in case of fixed threshold method. In the usual variable threshold level method, an input video signal is integrated so as to obtain an average level and then the threshold level is determined according to the average level thus obtained. Such a method is fully applicable when the average level of the video signal changes relatively slowly, but is not always applied if the video signal level changes abruptly. For example, in case of reading-out characters, marks, etc. which are recorded or labeled on box, card, etc., a video signal amplitude changes abruptly at an edge of box, card, label, etc., so that it is difficult to perform the correct reading-out procedure by the known method mentioned above. Especially, in case of reading out a color printing on box, card, label, etc., the video signal level is fairly variable according to the color.

Moreover, in case of using an automatic reading-out apparatus the detected video signal must be converted into a binary signal. For this purpose a plurality of slice levels must be set up on the basis of the threshold level, and then each slice level thus obtained is compared with the input video signal. If the method of using the plurality of slice levels is combined with the variable threshold method, it is expected to perform more precise reading-out procedure. However, in such a method, since a pitch between successive slice levels and thus, a span of whole slice levels are made constant, it is not possible to carry out the precise reading-out procedure by only varying the standard level such as the threshold level.

SUMMARY OF THE INVENTION

The present invention has for its object to provide a novel and useful reading-out apparatus which can perform more accurate reading-out procedure even in case that a level of a video signal changes abruptly, and is so composed that a pitch between a plurality of slice levels and a span of the slice levels can be set up to the best suitable values.

According to the invention, an apparatus for reading out features such as characters and marks, comprises picking-up means for generating a video signal by scanning an object having the features to be read-out;

a background level detecting circuit for exclusively detecting a background level corresponding to a background of the object from the video signal supplied from said picking-up means;

a control circuit for relatively adjusting at least one slice level and a magnitude of the video signal according to said background level; and a comparing circuit for generating an output video signal by comparing the video signal supplied from said picking-up means with said slice level.

DETAILED DESCRIPTION OF THE PREFERRED EMBODIMENTS

Figure 1A:
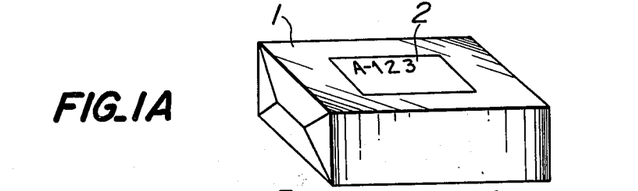
FIGS. 1A, 1B and 1C are schematic views showing features of objects to be read-out by the reading-out apparatus according to the invention.
Figure 1B:
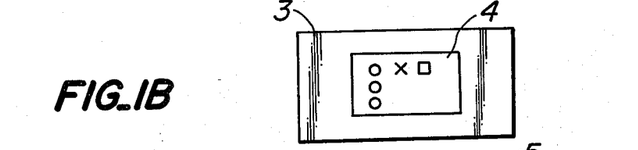
Figure 1C:
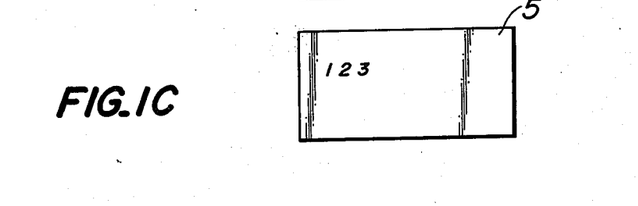

FIGS. 1A to 1C are schematic views showing various kinds of features of objects such as characters, marks, etc. to be read-out by the reading-out apparatus according to the invention. In FIG. 1A, features such as characters and marks are recorded on a label 2 stuck on a surface of a box 1. In FIG. 1B, features are recorded on a label 4 stuck on a card 3. In FIG. 1C, figures are directly recorded on a card 5. In the present invention, it is possible to read-out all the objects mentioned above, but, for the sake of simplicity, the explanation is limited to an example in case of reading-out characters, marks, etc. which are recorded on the label 4 stuck on the card 3 as depicted in FIG. 1B. In this case, it is possible to use various types of picking-up devices for scanning the objects, but in the present invention it is preferable to use such a picking-up device of line scanning type e.g. linear CCD array.

Figure 2:
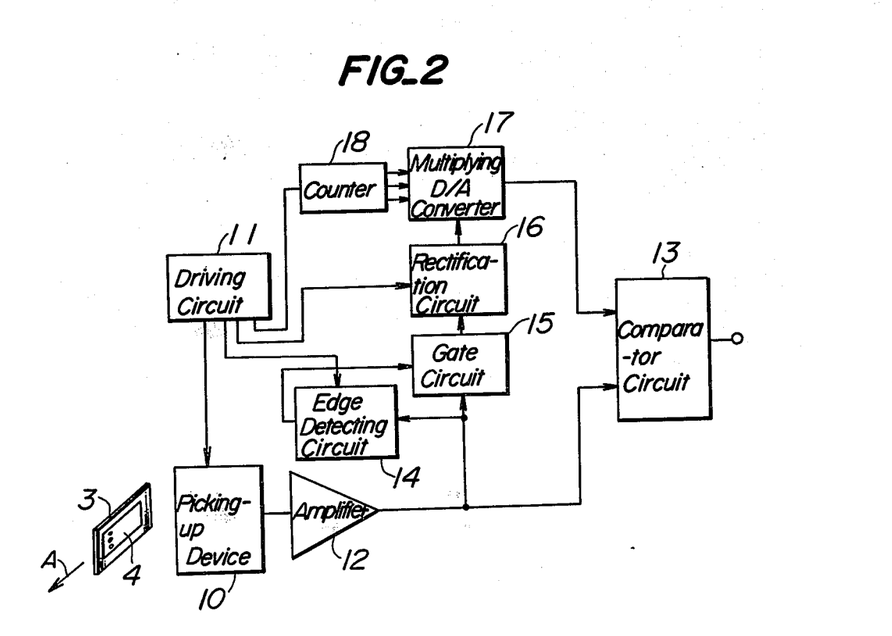
FIG. 2 is a block diagram illustrating one embodiment of the reading-out apparatus according to the invention.

FIG. 2 is a block diagram illustrating one embodiment of the reading-out apparatus according to the invention. In FIG. 2, the card 3 which is travelled in an arrow A direction is picked up by a picking-up device 10 composed of a linear CCD array. In order to drive this picking-up device 10, a driving circuit 11 is arranged.

Figure 3:
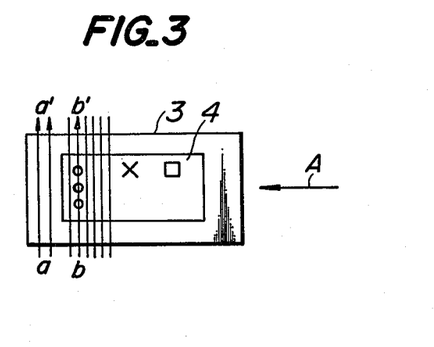
FIG. 3 is a schematic view illustrating scanning lines on an object to be read-out.
Figure 4A:
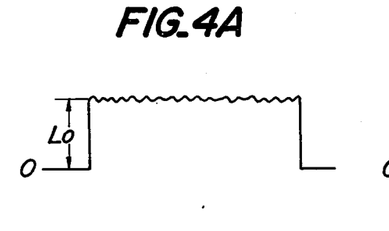
FIGS. 4A, 4B, 4C and 4D are schematic diagrams showing signal waveforms for explaining an operation of the reading-out apparatus according to the invention.

FIG. 3 is a schematic view illustrating scanning lines on an object to be read-out. In FIG. 3, the card 3 is travelled in an arrow A direction perpendicular to a scanning one at a given speed. At first, a background part of the card 3 is scanned and for example in a scanning line a—a′, a video signal illustrated in FIG. 4A is obtained. When the card 3 is further advanced, the label 4 is scanned along a line b—b′ to obtain the video signal shown in FIG. 4B. In the present embodiment, according to a travel of the card 3, at first an edge part of the card 3 is scanned and then a video signal corresponding to the background of the label 4 is obtained and then the label 4 is scanned and characters and marks recorded thereon are scanned. A standard level is detected from the video signal obtained by scanning the background part, and then a standard value of a slice level, pitch, span, etc. are set up according to the standard level thus detected.

As illustrated in FIG. 2, the video signal obtained by the picking-up device 10 is amplified by an amplifier 12 and then supplied to one input terminal of a comparing circuit 13. The slice level mentioned above is supplied to the other input terminal of this comparing circuit 13. In order to generate this slice level, the video signal amplified by the amplifier 12 is supplied to an edge detecting circuit 14. A line synchronizing signal from the driving circuit 11 is also supplied to this edge detecting circuit 14. By means of the edge detecting circuit 14, a gate circuit 15 is set conductive when the end of scanning for the background part of the card 3 is detected, and then the video signal obtained by a scanning line a—a′ illustrated in FIG. 3 is supplied to a rectification circuit 16 through the gate circuit 15. The video signal mentioned above has a waveform shown in FIG. 4A and a level $L_0$ of the video signal obtained by scanning the background part of the card 3 is detected by processing this video signal by means of the rectification circuit 16. This rectification circuit 16 has also an ability for storing data and then stroes a detected level till the end of scanning for a whole card.

Figure 4B:
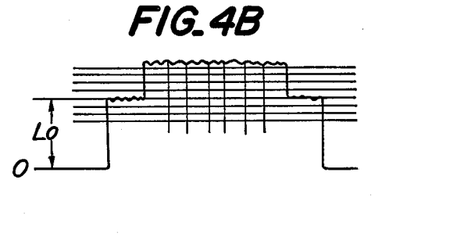
Figure 4C:
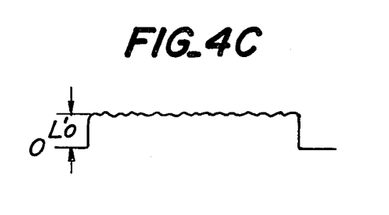

The level $L_0$ expressing the background part of the card 3 thus detected is supplied to a multiplying D/A converter 17 as a standard level. To this converter 17 is also supplied an output of a counter 18 which generates the number of output signals corresponding to that of desired slice levels by receiving a control signal from the driving circuit 11. In this embodiment, since the number of slice levels is set up eight as depicted in FIG. 4B, it is necessary to make an output of the counter 18 three bits. Moreover, the fourth level from the lowermost one among aforesaid eight slice levels is made same level as that of the background part mentioned above as the standard level. Therefore, if $S_0$ is assumed to express a given span corresponding to a dynamic range of the level, the value of each slice levels can be described as follows.

$$L_o\left(1 - \frac{S_o}{7} \times 3\right), \qquad L_o\left(1 - \frac{S_o}{7} \times 2\right)$$

$$L_o\left(1 - \frac{S_o}{7} \times 1\right), \qquad L_o\left(1 - \frac{S_o}{7} \times 0\right)$$

$$L_o\left(1 + \frac{S_o}{7} \times 1\right), \qquad L_o\left(1 + \frac{S_o}{7} \times 2\right)$$

$$L_o\left(1 + \frac{S_o}{7} \times 3\right), \qquad L_o\left(1 + \frac{S_o}{7} \times 4\right)$$

Since $L_0$ is supplied from the rectification circuit 16 and $S_0$ is set up previously as mentioned above corresponding to a dynamic range of the level, it is possible to generate successively the slice levels described above according to the output of the counter 18. The slice levels generated in the way described above are supplied to the comparing circuit 13.

Figure 4D:
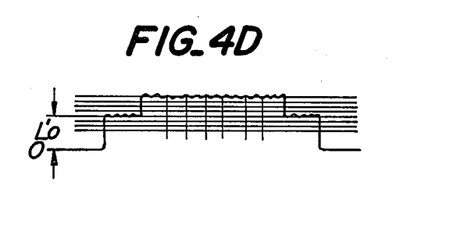

In this manner, even if the level of video signal obtained by scanning the card 3 is fluctuated, the reading-out can be effected accurately. For instance, even in case that the level of video signal obtained by scanning the card along the b—b′ as shown in FIG. 4D is fluctuated to become small, it is possible to perform an accurate reading-out procedure, because the standard value $L_0$ and the pitch of slice levels become small accordingly.

In the embodiment mentioned above, use is made of a serial type comparing circuit in which each instantaneous value of video signal supplied from the picking-up device 10 is compared successively with each eight slice levels mentioned above, but it is possible to use parallel type comparing circuit such that the video signal is compared with a plurality of slice levels at the same time.

Figure 5:
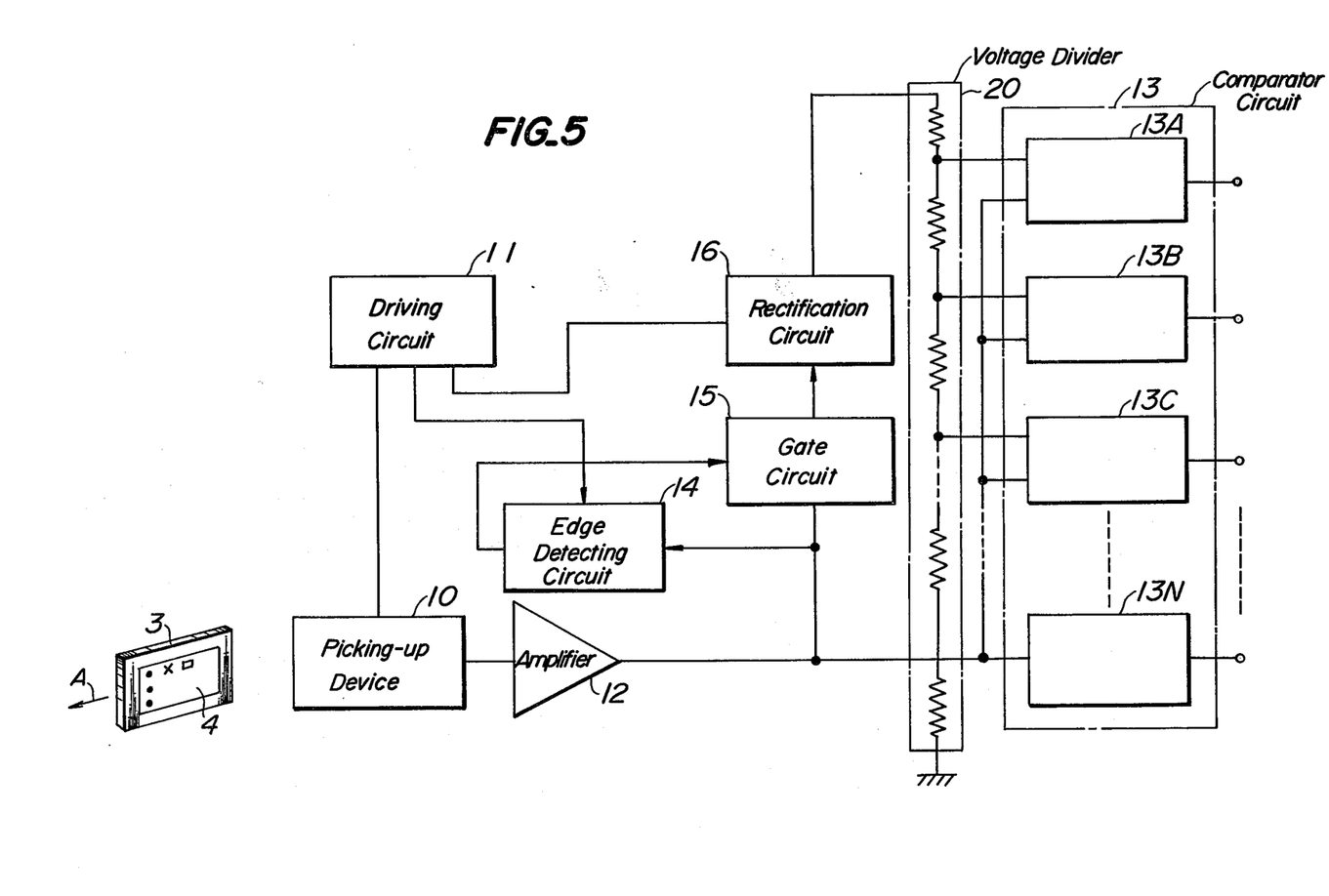
FIG. 5 is a block diagram showing another embodiment of the reading-out apparatus according to the invention.

FIG. 5 is a block diagram showing another embodiment of the reading-out apparatus which performs parallel type comparison according to the invention. The same portions as those of the embodiment illustrated in FIG. 2 are denoted by the same numerals. In this embodiment, in order to detect the level of video signal obtained by scanning the background part of the card 3, the edge detecting circuit 14, the gate circuit 15, and the rectification circuit 16′ are arranged. However in this embodiment, the level $L_0$ of the video signal obtained by scanning the background part of the card is not applied as it is, but the voltage which is multiplied by k is generated. This output voltage $kL_0$ is applied to a voltage divider 20 composed of a plurality of resistors, and each of N intermittent terminals of the voltage divider 20 is connected to one input terminal of N comparing stages 13A, 13B, ..., 13N constituting the comparing circuit 13. The output video signal of the amplifier 12 is commonly supplied to the other input terminals of these comparing stages. Each resistor value of the voltage divider 20 is suitably selected, and then given slice levels are generated simultaneously from respective intermittent terminals. In this case, the value of a given slice level is made identical with the video signal obtained by scanning the background part of the card 3.

Figure 6:
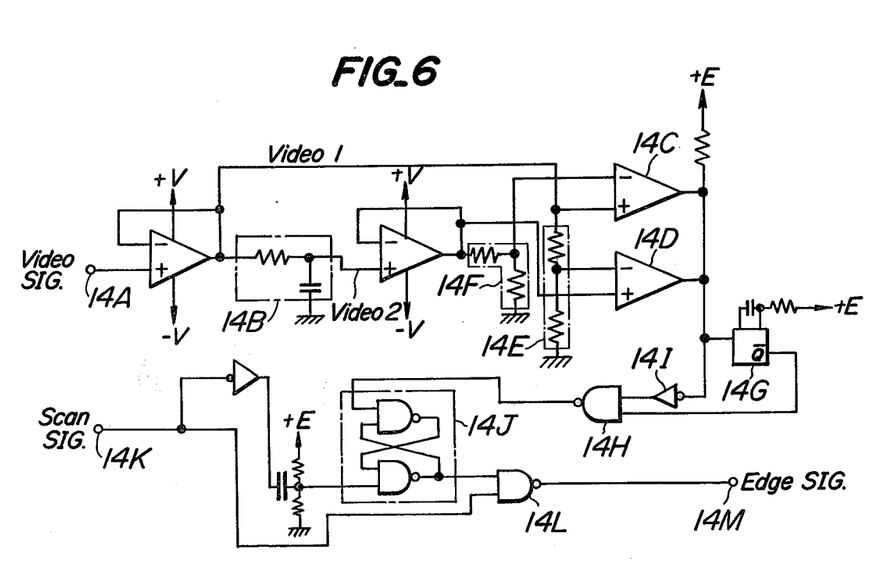
FIG. 6 is a circuit diagram showing an edge detecting circuit of the reading-out apparatus of the invention.
Figure 7A:
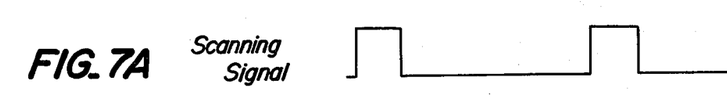
FIGS. 7A, 7B, 7C, 7D, 7E, 7F and 7G are schematic diagrams illustrating signal waveforms for explaining an operation of the edge detecting circuit illustrated in FIG. 6.
Figure 7B:
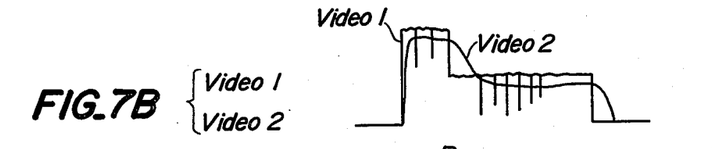
Figure 7C:
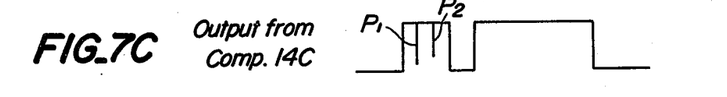
Figure 7D:
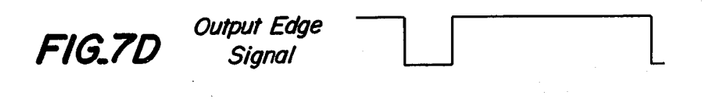
Figures 7E, 7F:
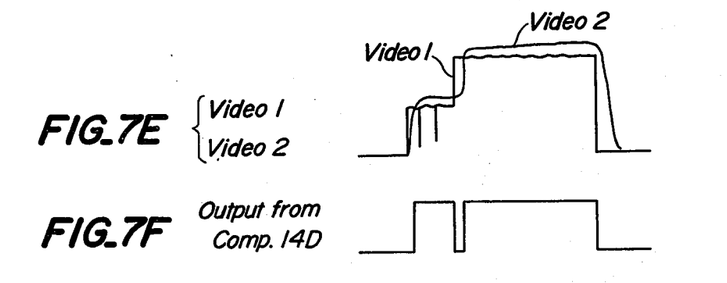
Figure 7G:
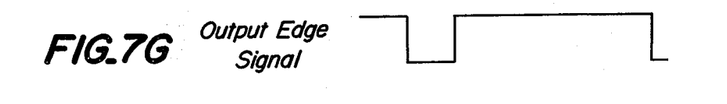

FIG. 6 is a circuit diagram showing an edge detecting circuit 14 of the embodiment according to the reading-out apparatus illustrated in FIG. 2 and FIG. 5. The video signal obtained by the procedure mentioned above is supplied to an input terminal 14A and is divided into two video signals, i.e. video 1, video 2, wherein video 1 signal represents the video signal itself and video 2 signal represents the signal which is delayed by a given time by means of a filter 14B. Both video 1 and video 2 signals are supplied to first and second comparators 14C and 14D each having an open-collector output stage. As illustrated in FIG. 6, the video 1 signal is directly supplied to the first comparator 14C, but is supplied to the second comparator 14D through a first potentiometer 14E. Contrary to this, the video 2 signal is directly supplied to the second comparator 14D, but is supplied to the first comparator 14C via a second potentiometer 14F. FIGS. 7A to 7D and 7E to 7G are schematic views depicting waveforms of the edge detecting circuit 14 in case that the background levels outside a frame of the object to be read-out is larger and smaller than that inside a frame, respectively. As shown in FIGS. 7B and 7C, when the background level is larger than that in the frame, the first comparator 14C is made operable, but the second comparator 14D is not made operative and the comparator 14C produces an output signal illustrated in FIG. 7C. Contrary to this when the background level is smaller than that in the frame as illustrated in FIG. 7E, the second comparator 14D is made operative, but the first comparator 14C does not operate and the second comparator 14D produces an output signal shown in FIG. 7F. If the background includes characters, pulses $P_1$, $P_2$ appear in the output signal and these pulses $P_1$, $P_2$ must be differentiated from the edge to be detected. For this purpose, the output signal from the comparators 14C, 14D is supplied to a one-shot multivibrator 14G which produces an output pulse having a time duration T each time being triggered by the output signal from the comparators. The time duration T is selected to be much longer than a width of the pulses $P_1$, $P_2$ in the output signal. Then the output signal from the comparators 14C, 14D and the output signal from the multivibrator 14G are supplied to a NAND gate 14H through an inverter 14I and directly, respectively. Then the pulses $P_1$, $P_2$ are made ineffective and only the edge is exclusively detected. The output from the NAND gate 14H is supplied to one input of a flip-flop 14J having the other input coupled to an input terminal 14K to which a scanning signal for the picking-up device 10 is supplied from the driving circuit 11 (see FIG. 5). Then the flip-flop 14J is reset by the scanning signal and is set by the edge signal from the NAND gate 14H. An output signal from the flip-flop 14J is supplied through a NAND gate 14L to an output terminal 14M as an output edge detection signal shown in FIG. 7D. In this manner, according to the edge detecting circuit 14, even if characters are described in a part not to be read-out, since the signal obtained from such characters has a very narrow width, it is possible to remove such signals completely. Moreover, in case that there is no frame and the level to be read-out is same as that of the background, the edge signal is not generated at all.

Figure 8:
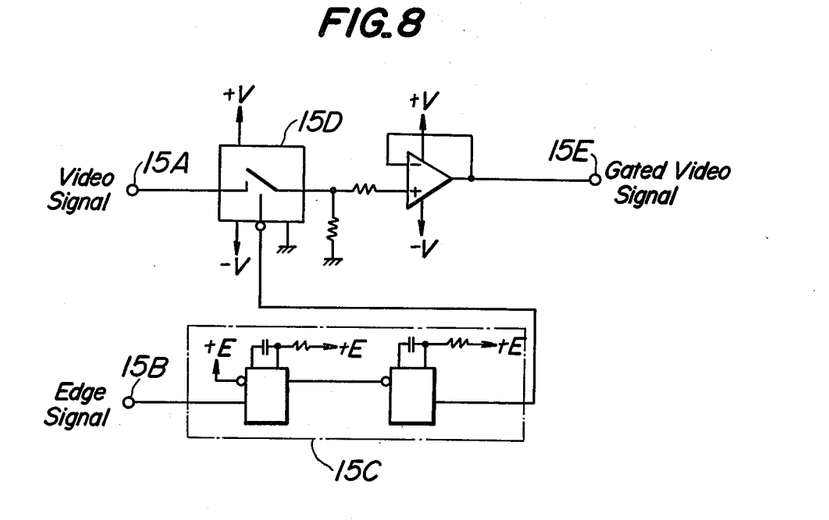
FIG. 8 is a circuit diagram depicting a gate circuit of the reading-out apparatus of the invention.

FIG. 8 is a circuit diagram depicting an embodiment of the gate circuit 15 of the reading-out apparatuses illustrated in FIGS. 2 and 5. In this gate circuit as shown by waveforms illustrated in FIGS. 9A to 9D, the required part of the video signal i.e. information inside the frame is selected under the control of the edge signal generated from the edge detecting circuit 14 mentioned above.

Figure 9A:
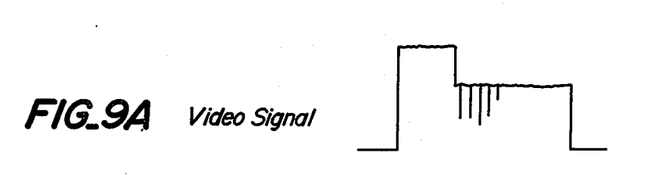
FIGS. 9A, 9B, 9C and 9D are schematic diagrams showing signal waveforms so as to explain an action of the gate circuit depicting in FIG. 8.
Figure 9B:
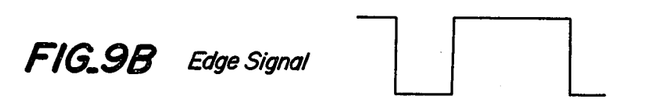
Figures 9C, 9D:
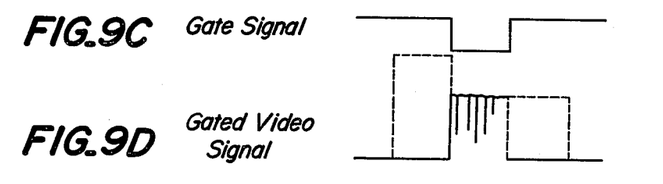

The gate circuit comprises first and second input terminals 15A and 15B receiving the video signal shown in FIG. 9A and the edge signal illustrated in FIG. 9B. The edge signal is supplied to a gate pulse generator 15C which comprises a series circuit of two one-shot multivibrators and produces a gate signal shown in FIG. 9C. The gate signal thus produced is supplied to an analog gate 15D as a switching signal so as to gate the picture signal including the character information out of the video signal. In this manner, at an output terminal 15E there is obtained the gated video signal shown in FIG. 9D.

Figures 10A, 10B:
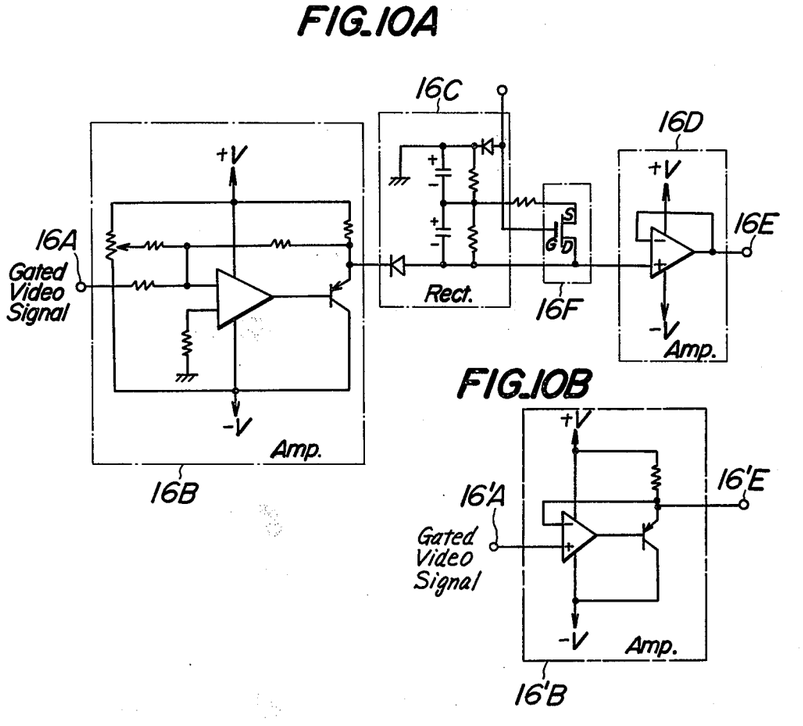
FIGS. 10A and 10B are circuit diagrams illustrating rectification circuits of the embodiments according to the invention.

FIGS. 10A and 10B are circuit diagrams illustrating an embodiment of the rectification circuits 16 and 16' in the reading-out apparatuses depicted in FIGS. 2 and 5, respectively. In the rectification circuit 16 shown in FIG. 10A, the gated video signal from the gate circuit 15 is supplied to an input terminal 16A and is then amplified by an amplifier 16B. The amplified video signal is further supplied to a rectifying circuit 16C comprising a rectifying diode and an RC time constant circuit. A rectified and integrated direct current signal is supplied through a direct current amplifier 16D to an output terminal 16E. This output signal is used as the standard level $L_0$ in the succeeding converter 17. Between the rectifying circuit 16C and the amplifier 16D is connected a switching circuit 16F comprising a field effect transistor. The operation and function of the switching circuit 16F will be explained in detail later with reference to another embodiment shown in FIG. 12.

The rectification circuit 16' illustrated in FIG. 10B comprises an amplifier 16'B corresponding to the amplifier 16B in FIG. 10A. The gated video signal from the gate circuit 15 is supplied to an input terminal 16'A and is amplified by the amplifier 16'B. The amplified signal is supplied to an output terminal 16'E.

Figure 11:
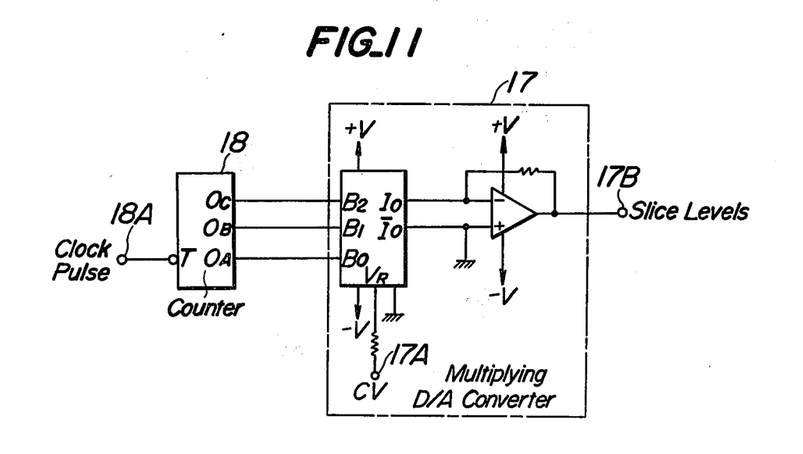
FIG. 11 is a circuit diagram showing a slice circuit of the embodiment according to the invention.

FIG. 11 is a circuit diagram showing an embodiment of the counter 18 and multiplying D/A converter 17 of the reading-out apparatus illustrated in FIG. 2. The counter 18 counts clock pulses supplied to an input terminal 18A and three bit output $O_A$, $O_B$, $O_C$ of the counter 17 is supplied to the multiplying D/A converter 17 and the standard level signal from the rectification circuit 16 is supplied to an input terminal 17A. Then eight slice levels are generated successively at an output terminal 17B from the converter according to the formula mentioned above with respect to the standard level $L_0$.

Figure 12:
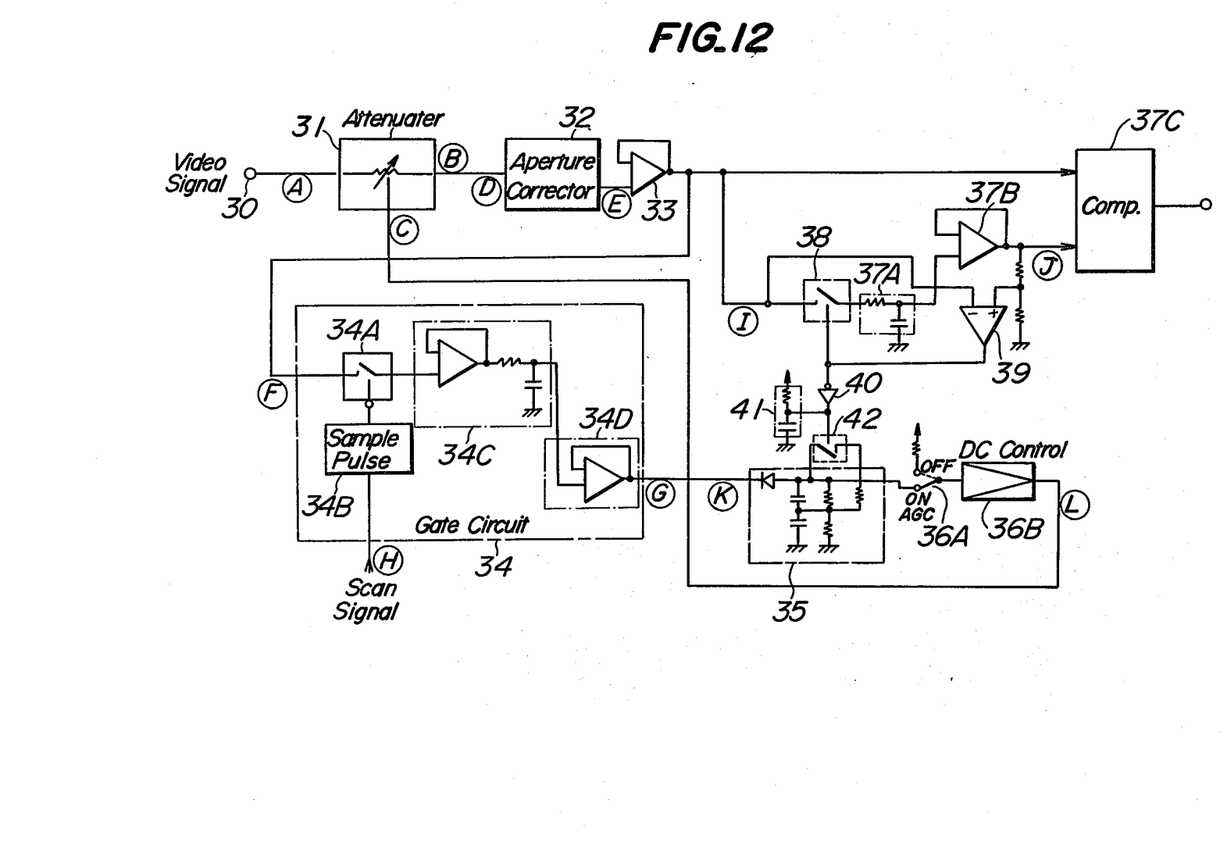
FIG. 12 is a block diagram illustrating another embodiment of the reading-out apparatus according to the invention.

FIG. 12 is a block diagram illustrating another embodiment of the reading-out apparatus according to the invention. In the previous embodiments shown in FIGS. 2 and 5, the slice levels are adjusted in accordance with the detected background level. Contrary to this, in the present embodiment, the slice levels are fixed, but the magnitude of the video signal is adjusted in accordance with the detected background level. Further, in ths embodiment, even if the object is scanned only one time, the output signal can be obtained efficiently and accurately by combining circuits such as an AGC (Automatic Gain Control) circuit which is equivalent to the dynamic slice method by means of the multiplying D/A converter, a gate circuit for obtaining the background level inside a frame, a sub-dynamic slice circuit for detecting an envelope of the signal, and an output correcting circuit for compensating an abrupt fluctuation of the input signal.

Figure 13A:
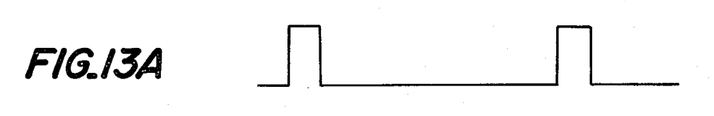
FIGS. 13A, 13B and 13C are diagrams for explaining the operation of the apparatus shown in FIG. 12.
Figure 13B:
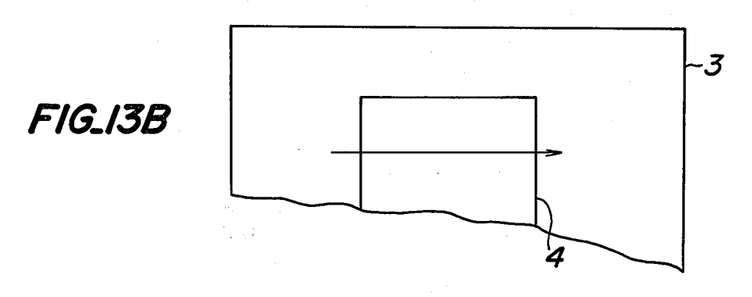
Figure 13C:
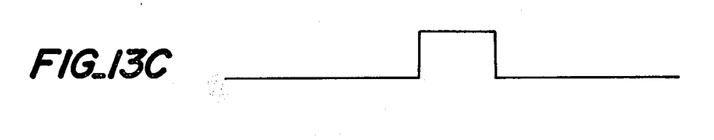

Now the construction and operation of this embodiment will be described hereinafter according to the block diagram depicted in FIG. 12. The video signal is supplied to an input terminal 30 of the AGC circuit comprising a variable attenuator 31 and the amplitude of the video signal is adjusted to a given level. The adjusted video signal is supplied to an aperture corrector 32 and a buffer amplifier 33. In order to derive the AGC signal, the output from the buffer amplifier 33 is supplied to a gate circuit 34 which comprises an analog switch 34A, a sampling pulse generator 34B for generating a sampling pulse synchronized with the scanning signal shown in FIG. 13A, an integrating circuit 34C and a buffer amplifier 34D. The sampling pulse generator 34B is so constructed that it produces the sampling pulse which situates inside the frame. To this end, according to this embodiment, the scanning position has previously been controlled roughly by detecting a position of the label 4 applied on the object 3 as shown in FIG. 13B. Then, there can be obtained the sampling pulse illustrated in FIG. 13C which corresponds to a middle portion of the label 4 and thus, the gated video signal always represents that of the background of the label 4. Then the gated video signal is supplied to a rectification circuit 35 similar to that shown in FIG. 10A and the background level is detected as the standard level. This standard signal is applied via a switch 36A to a direct current control circuit 36B to derive the AGC signal which is supplied to the variable attenuator 32 to adjust the amplitude of the video signal.

Moreover, in this embodiment, a peak detector circuit is provided in addition to the AGC circuit. The output signal from the amplifier 33 is supplied to an integration circuit 37A through a video switch 38 to detect an envelope of video signal and then the envelope signal thus detected is supplied through an amplifier 37B to a reference input of a comparator circuit 37C so that this signal serves dynamic threshold signal. Furthermore, the envelope signal is also supplied to a comparator circuit 39 wherein the video signal is compared with the envelope signal which is set about five percentages below the video signal. If the background level signal changes extraordinarily, the switch 38 which has been made on until this time, turns off by an output of the comparator circuit 39. In this manner it is possible to prevent the extraordinary video signal from being supplied to the integrating circuit 37A. At the same time, a gate 40 is made off for a time period of about 100 $\mu$s determined by a charging time constant of an RC circuit 41. At the end of the time period, a switch 42 is turned on and the rectified output level from the rectification circuit 35 is reset and a given direct current level is generated from the circuit 35. Then, the variable attenuator 31 produces a signal corresponding to a white level. The above mentioned operation is effected when the video signal disappears. When the switch 36A is changed over as illustrated by a dotted line in FIG. 12, the AGC circuit is disconnected from the circuit and a suitable voltage may be applied to the control circuit 36B to adjust various portions in the circuit.

Figure 14:
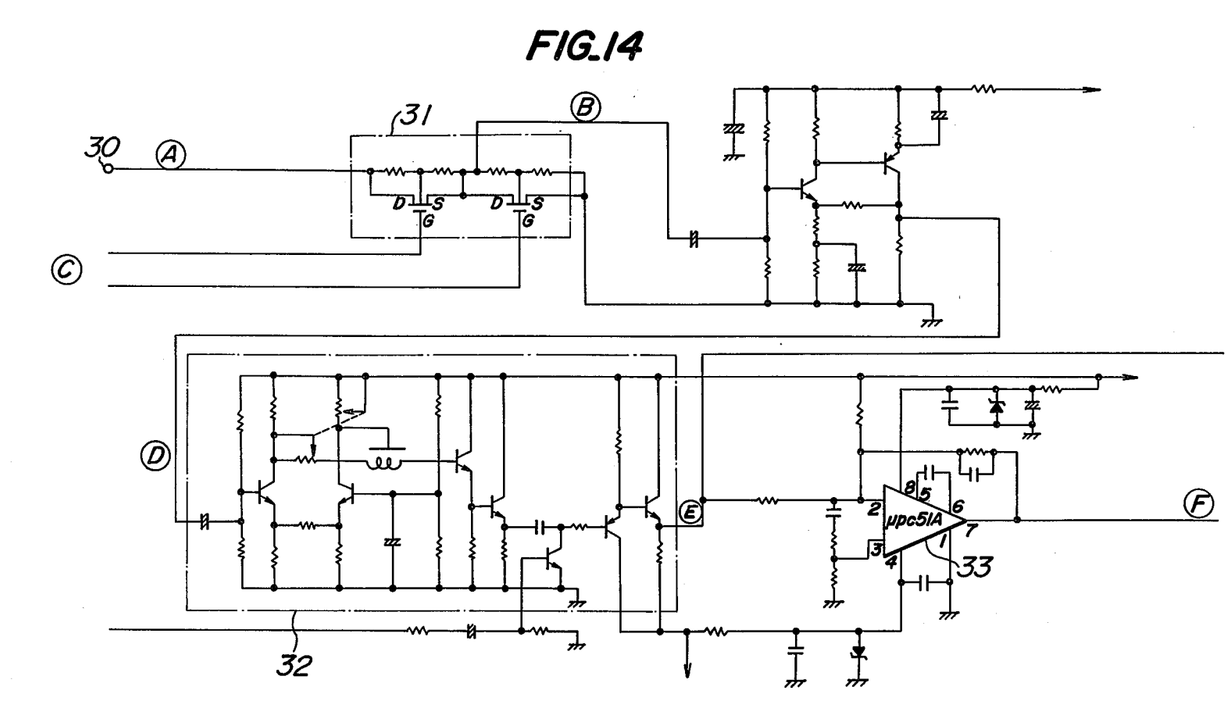
FIGS. 14, 15, and 16 are circuit diagrams showing detailed circuits of AGC circuit, gate circuit, and peak detector circuit in the embodiment illustrated in FIG. 12, respectively.
Figure 15:
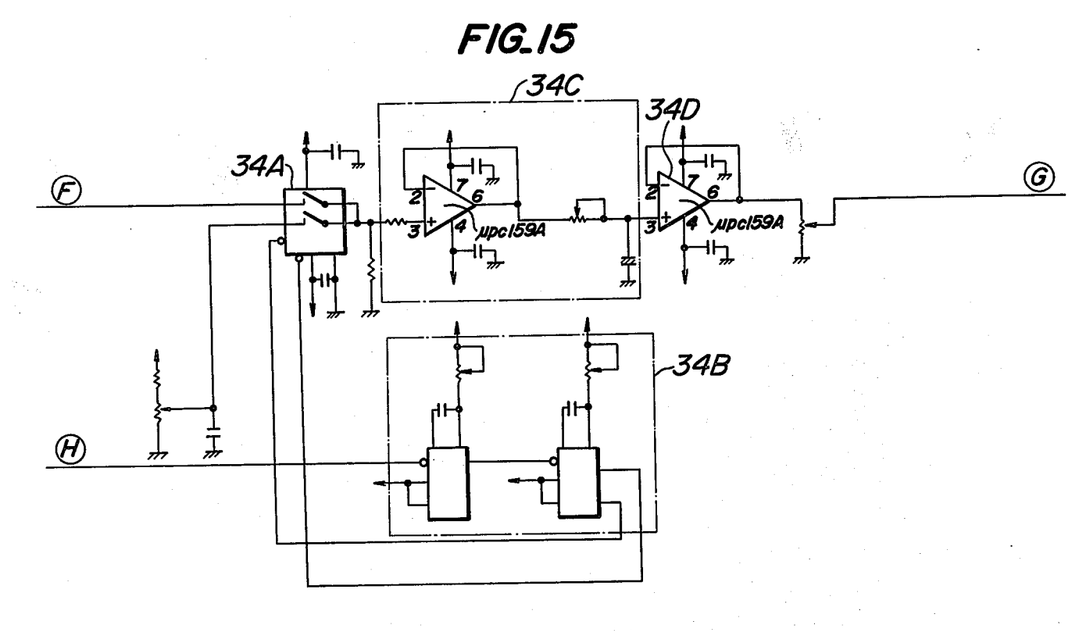
Figure 16:
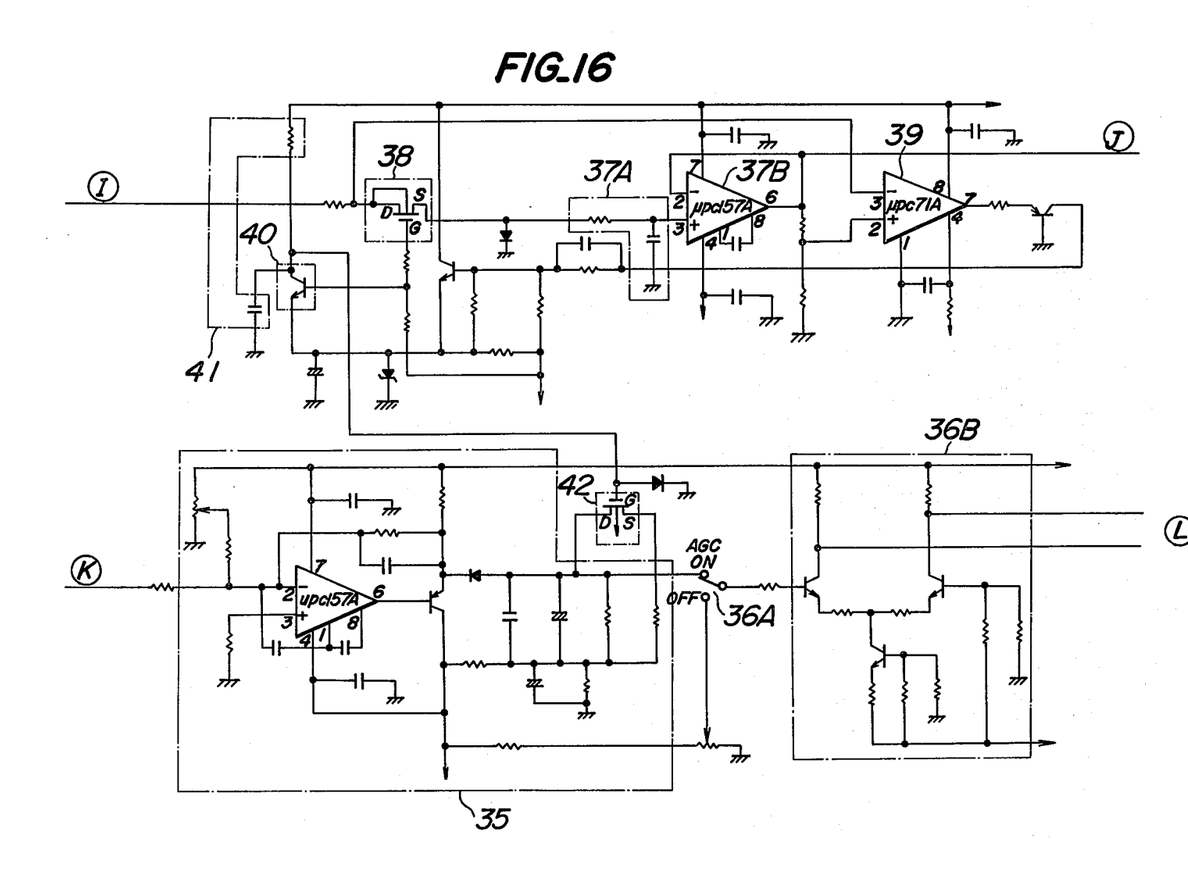

FIGS. 14, 15, and 16 are circuit diagrams illustrating concrete construction of the AGC circuit, gate circuit, and peak detector circuit in the embodiment shown in FIG. 12, respectively. In FIGS. 14, 15 and 16, symbols A to L in each figure correspond to those in FIG. 12.

According to the invention, since the video signal level obtained by scanning the background part of the object on which characters, marks, etc. to be read-out are recorded is first detected to produce the standard level, and then the amplitude of slice levels and the pitch of slice levels or the amplitude of the video signal is adjusted in accordance with the standard level, even in case of changing the level of the video signal abruptly, the suitable slice levels or the video signal can be always obtained. Therefore, it is possible to obtain the precise binary video signal and to remove the pattern recognition error.

What is claimed is:

1. An apparatus for reading-out features such as characters and marks, comprising
   picking-up means for generating a video signal by scanning an object having the features to be read out;
   background level detecting means for exclusively detecting a background level corresponding to a background of the object from the video signal supplied fom said picking-up means;
   control means comprising a slice level setting circuit for adjusting the span and pitch of a plurality of slice levels according to said background level; and
   a comparator circuit for generating an output video signal by comparing the video signal supplied from said picking-up means with said slice levels.

2. An apparatus according to claim 1, wherein said slice level setting circuit comprises a counter for counting clock pulses to produce a count signal and a multiplying digital to analog converter for receiving said background level and count signal to produce successively a plurality of slice levels having the span and pitch depending upon the background level.

3. An apparatus according to claim 1, wherein said slice level setting circuit comprises a voltage divider formed by a series circuit of resistors having one end connected to a video signal input terminal, the other end connected to a reference potential point and a plurality of output terminals connected to junctions between successive resistors.

4. An apparatus according to claim 1, wherein said picking-up means comprises a linear CCD array.

5. An apparatus according to claim 1, wherein said background level detecting means comprises an edge detector for detecting an edge signal from the video signal, a gate pulse generator for receiving the edge signal to produce a gate signal, a gate circuit for gating the video signal in response to the gate signal to produce a gated video signal and a rectification circuit for rectifying the gated video signal to produce the background level.

6. An apparatus according to claim 5, wherein said edge detector comprises a delay circuit to produce a delayed video signal, a pair of potentiometers for producing slightly attenuated video signal and delayed video signal, respectively and a pair of comparators for comparing the video signal and attenuated-delayed video signal and the attenuated video signal and delayed video signal, respectively.

7. An apparatus according to claim 6, wherein said edge detector further comprises a monostable multivibrator triggered by an output signal from said comparators to produce a pulse having a given time duration and a logical circuit for producing a product of the output signal from the comparators and the output pulse from the monostable multivibrator.

8. An apparatus according to claim 1, wherein said control means comprises a variable attenuator for adjusting the magnitude of the video signal in accordance with the background level.

9. An apparatus according to claim 8, further comprising an integrating circuit for producing an envelope signal of the video signal and means for supplying the envelope signal to the comparator circuit as the slice level.

10. An apparatus according to claim 9, further comprising a comparator for comparing the envelope signal with the video signal to detect an abrupt variation of the video signal, a video switch connected between the variable attenuator and the integrating circuit and being turned off upon detection of said abrupt variation of the video signal.

11. An apparatus according to claim 10, further comprising a switch connected in the background level detecting means and being turned on in response to the detection of the abrupt variation of the video signal to change the background level to a predetermined level.

12. An apparatus for reading-out features such as characters and marks, comprising
picking-up means for generating a video signal by scanning an object having the features to be read out;
background level detecting means comprising an edge detector for detecting an edge signal from the video signal, a gate pulse generator for receiving the edge signal to produce a gate signal, a gate circuit for gating the video signal in response to the gate signal to produce a gated video signal and a rectification circuit for rectifying the gated video signal to produce a background level corresponding to a background of the object from the video signal supplied from said picking-up means;
control means for relatively adjusting at least one of a slice level and the magnitude of the video signal according to said background level; and
a comparator circuit for generating an output video signal by comparing the video signal with said slice level.

13. An apparatus according to claim 12, wherein said edge detector comprises a delay circuit to produce a delayed video signal, a pair of potentiometers for producing a slightly attenuated video signal and an attenuated delayed video signal, respectively, and a pair of comparators for comparing the video signal and attenuated-delayed video signal and the attenuated video signal and delayed video signal, respectively.

14. An apparatus according to claim 13, wherein said edge detector further comprises a monostable multivibrator triggered by an output signal from said comparators to produce a pulse having a given time duration and a logical circuit for producing a product of the output signal from the comparators and the output pulse from the monostable multivibrator.

15. An apparatus for reading-out features such as characters and marks, comprising
picking-up means for generating a video signal by scanning an object having the features to be read out;
background level detecting means for exclusively detecting a background level corresponding to a background of the object from the video signal supplied from said picking-up means;
control means comprising a variable attenuator for adjusting the magnitude of the video signal according to said background level;
an integrating circuit for producing an envelope signal of the video signal; and
a comparator circuit for generating an output video signal by comparing the video signal supplied from said picking-up means with said envelope signal.

16. An apparatus according to claim 15, further comprising a second comparator for comparing the envelope signal with the video signal to detect an abrupt variation of the video signal, and a video switch connected between the variable attenuator and the integrating circuit and being turned off upon detection of said abrupt variation of the video signal.

17. An apparatus according to claim 16, further comprising a switch connected in the background level detecting means and being turned on in response to the detection of the abrupt variation of the video signal to change the background level to a predetermined level.

* * * * *